United States Patent [19]

Painter et al.

[11] 4,450,397
[45] May 22, 1984

[54] ELECTRONIC AC INDUCTION MOTOR BRAKE

[75] Inventors: Walter C. Painter, Venetia, Pa.; David J. Luttmer, Chicago; Alvin J. Galloway, Oak Park, both of Ill.

[73] Assignee: Rockwell International Corporation, Pittsburgh, Pa.

[21] Appl. No.: 429,803

[22] Filed: Sep. 30, 1982

[51] Int. Cl.³ .............................................. H02P 3/24
[52] U.S. Cl. .................................... 318/762; 318/375
[58] Field of Search ............... 318/762, 760, 761, 763, 318/759, 375, 376

[56] References Cited

U.S. PATENT DOCUMENTS

| | | | |
|---|---|---|---|
| 3,341,758 | 9/1967 | Plumpe | 318/762 |
| 3,398,343 | 8/1968 | Plumpe | 318/762 |
| 3,475,669 | 10/1969 | Oltendorf | 318/762 |
| 3,699,416 | 10/1972 | Sloan | 318/761 |
| 3,708,734 | 1/1973 | Rowe | 318/762 |
| 3,714,536 | 1/1973 | Foster | 318/470 |
| 3,781,619 | 12/1973 | Rashkovich | 318/761 |
| 3,805,133 | 4/1974 | Hatakeyama | 318/761 |
| 3,851,233 | 11/1974 | Sherman | 318/762 |
| 3,897,595 | 7/1975 | Fearno | 318/762 |
| 4,151,453 | 4/1979 | Suzuki | 318/762 |
| 4,195,255 | 3/1980 | Guttmann | 318/364 |
| 4,243,919 | 1/1981 | Brown | 318/269 |
| 4,275,341 | 1/1981 | Huber | 318/376 |
| 4,323,833 | 4/1982 | Watanabe | 318/376 |
| 4,395,670 | 7/1983 | Podell | 318/762 X |

FOREIGN PATENT DOCUMENTS

55-160986 12/1980 Japan ................... 318/762

Primary Examiner—B. Dobeck
Assistant Examiner—Patrick Keane
Attorney, Agent, or Firm—Mason, Fenwick & Lawrence

[57] ABSTRACT

A braking control circuit for an alternating current motor is disclosed as having a winding and adapted to be coupled to an energizing control circuit for connecting a source of AC voltage to and for disconnecting the source of AC voltage from the winding. The braking control circuit comprises a selectively controlled rectifier operative in a first conductive mode for applying rectified current to the winding to brake the motor and in a second non-conductive mode, and a switching circuit coupled to the rectifier and responsive to the disconnecting of the source of AC voltage from the winding for switching the rectifier between its first and second modes at a first switching rate to brake the motor rotation at a corresponding first braking rate, and thereafter for switching the rectifier between its first and second modes at a second switching rate different from the first switching rate to brake the motor at a corresponding second braking rate.

24 Claims, 4 Drawing Figures

ELECTRONIC AC INDUCTION MOTOR BRAKE

BACKGROUND OF THE INVENTION

1. Field of the Invention

This invention relates to electronic circuits for braking alternating current induction motors and more particularly, to such circuits for braking motors for driving power tools.

2. Description of the Prior Art

Many types of machinery including power tools are driven by electrical motors, which are energized for performing a machining operation and thereafter, deenergized so that a further machining step may be performed. In such machines, it is usually essential that the prime mover illustratively in the form of a alternating current induction motor be stopped quickly and precisely, so that there will be no significant over-travel. For example, alternating current motors are used to drive radial arm saws; after the motor is deenergized, it may require two or three minutes for the motor driven saw blade to "coast" before the saw blade is brought to a stop. During this coast down period, the operator must avoid inadvertent contact with the rotating blade for obvious safety reasons. The operator also is restricted from re-adjusting the saw blade until it comes to a complete stop. As a result of the coasting or over-travel, productivity is reduced.

Therefore, it is desirable to employ a braking mechanism so that machinery will stop almost immediately when desired, and over-travel will be eliminated or at least reduced to non-significant intervals. Mechanical braking mechanisms are known in the art and rely primarily upon the engagement of two frictional members, such as a brake drum and brake band, or a clutch disk and clutch plate. This type of braking device, being essentially mechanical, requires a time interval to bring the machinery to a stop. More over, mechanical braking devices wear rather rapidly and, therefore, require frequent adjustment, maintenance and repair.

Due to these deficiencies of mechanical brakes, electrical or electronic circuitry has been employed for braking alternating current induction motors. A summary of various forms of electrical brakes is set forth in *International Rectifier News* for February-March 1957 in an article entitled "Direct Current Braking for AC Induction Motors." Known methods include applying electrical power in reverse phase rotation to develop a reverse torque, dynamic braking in which a resistive load is shunted across the motor terminals, capacitor braking in which capacitors are connected across two or three phases of an induction motor; re-generative braking applied to a motor driven above its synchronous speed, and direct current braking effected by applying a direct current to the field winding of an alternating current motor. This invention relates to a new and improved form of direct current braking of an alternating current induction motor.

As well recognized in the prior art, direct current braking employs the principle of removing an alternating current from rotatively energizing the motor and, in order to effect braking, applies an amplitude and time controlled DC voltage across the winding resulting in a static field across the stator which generates in the rotor of the motor a counterforce which cooperates with the static field to decelerate the rotor to a point of zero differential relative velocity with the static field. Such direct current or dynamic braking is achieved solely by electrical means and requires no mechanical modification to existing motors or equipment.

U.S. Pat. No. 4,243,919 of Brown is an example of braking an alternating current induction motor by applying DC pulses via a silicon controlled rectifier (SCR) through the field winding of the alternating current induction motor. In the Brown patent, a single SCR is turned on for an interval controlled by a simple transistor charged RC timing circuit. In particular, the SCR is rendered conductive during every positive half-cycle of the AC voltage to apply a half-wave rectified DC voltage to the motor field winding. A switch disclosed as being coupled to a foot controller of the motor is associated with a circuit for sensing the opening of the switch to initiate timing of the RC timing circuit, the timed interval being set to permit the motor to be completely braked. The output of the RC timing circuit is coupled to a gate of the SCR to initiate its firing.

U.S. Pat. No. 4,195,255 of Guttmann also discloses an SCR braking system for alternating current induction motors, wherein an SCR is turned on for a period of time to apply during that interval DC pulses in a manner to brake the motor. In particular, the SCR conduction time is made adjustable by means of a potentiometer.

Further, the prior art teaches the control of the braking force applied to alternating current induction motors by phase controlling a switching device such as an SCR or thyristor that is coupled to the motor's armature. U.S. Pat. No. 3,897,595 of Fearno discloses not only the adjustment of the braking time, but also the adjustment of the braking current as applied by a switching device in the form of an SCR to the motor. In particular, Fearno discloses a braking contactor having braking contacts for connecting a rectifier means to the AC source of power, the rectifying means taking the form of an SCR for varying the amount of current conducted or rectified through the stator field winding of the motor. A free wheeling diode is also connected by the closed braking contactor across the stator field winding in an oppositely polled manner from the SCR to absorb counter EMF generated in the field winding as the static field is applied to the rotor and a current is generated in the shorted conductors therein. In particular, a force or braking current circuit is connected to the gate of the SCR, whereby the firing of the SCR may be selectively controlled for a portion of each half-cycle of the AC voltage to vary the amount of current, i.e. the width of each DC pulse, applied to the stator field winding. A light source is coupled to the AC voltage applied to the stator field winding and serves to initiate the braking action when extinguished. When AC voltage is removed from the stator field winding, the light source darkens whereby the resistance of an optically coupled diode is increased to initiate the timing of an interval during which the DC current pulses are applied via the SCR to the stator field winding. The optically coupled diode also serves to energize the braking contactor to close the braking contact thus completing the circuit between the stator field winding and the SCR. The time duration during which braking current is applied by the SCR to the stator field winding and controlled by a further potentiometer.

Though the Fearno patent discloses that the SCR is fired only after his contactors are closed, it is apparent that a load is placed upon these contactors drawing current therethrough thus requiring relatively heavy duty motor contactors, which components are relatively expensive. Further, though an optical switch is provided by the use of the light source for detecting the energization and de-energization of the stator field winding, it is apparent that other circuitry is directly connected to the SCR as well as to the energizing or actuating coil of the braking contacts. Thus, it is possible for transients as would be applied by the three phase energizing lines to be imposed upon the Fearno's motor brake circuit.

In addition, the Fearno patent discloses the use of an RC circuit to control the conduction interval or angle that its SCR is turned on. In particular, the RC circuit comprises a potentiometer which is set to determine the conduction angle. However, the Fearno RC circuit limits the braking capabilities in that it is only able to fire its SCR for maximum angles of 90°, thereby limiting the conductive angle and thus the current applied to the winding of the motor to be braked.

Further, the Fearno patent discloses the firing of the SCR dependent upon the setting of a potentiometer, whereby once this potentiometer is set, the amount of current conducted or rectified through the stator field winding is set. By contrast, this invention contemplates the tailoring of the current pulses applied to the stator field winding in a manner that the braking torque is set initially high followed by a period in which the braking torque is reduced. Thus, it is possible to initially reduce the speed of the motor rapidly by applying high current (large conduction angle) DC pulses via an SCR to a motor's winding, followed by a period of reduced braking torque wherein the conduction angle of firing the SCR is reduced to thereby reduce the current applied to the stator field winding. In this manner, a maximum braking torque may be applied to a particular motor dependent upon the mechanical and electrical characteristics of the motor for a first brief period. However, if the maximum braking torque were applied over a prolonged period, the inertial stresses placed upon the motor as well as any mechanism or tool coupled thereto could be excessive. For example, if a radial saw were coupled to a motor, it is contemplated that the rotational forces applied to the saw blade may cause the saw blade to unloosen its retaining bolt, whereby the saw blade may be thrown from the motor with possible damage to the operator. Thus, it is desired, in accordance with the teachings of this invention, to reduce the braking torque in order to prevent damage to the motor or associated mechanism, the subsequent braking torque and interval thereof being dependent upon the nature of the mechanism or tool coupled to the motor.

Further, it is contemplated that the electronic motor brake of this invention is adaptable for the control of a wide range of motor sizes and voltage ratings including both single and three phase AC voltages. In this regard, it is necessary to set the maximum braking current dependent upon the particular type of motor and its electrical characteristics. Further it would be necessary to accommodate the particular energizing voltage, which may illustratively assume a value of 120, 220 or 440 volts or be single or plural phase.

SUMMARY OF THE INVENTION

It is therefore an object of this invention to provide a new and improved electronic alternating current induction motor brake that applies a braking torque profile in terms of a DC current to the motor winding in a manner to achieve the fastest possible stopping time while exerting a safe counter acting inertial force to the motor and its associated mechanism.

It is a further object of this invention to provide a new and improved electronic alternating current inducting motor brake that adjust the braking torque profile into a plurality of adjustable periods during which selected DC currents are applied to the motor's winding.

It is a more particular object of this invention to provide a new and improved electronic alternating current induction motor brake that is capable of controlling the conduction angle of a rectifying device such as an SCR for any selected period or angle of the positive 180° portion of the alternating current voltage cycle.

It is a still further object of this invention to provide a new and improved electronic alternating current induction motor brake that avoids the use of large, relatively expensive motor contactors for coupling a switching device such as an SCR in circuit with the motor, whereby controlled DC current or power is applied to the motor's winding.

It is a more particular object of this invention to provide a new and improved electronic alternating current induction motor brake that does not employ a contactor to apply the relatively high AC voltage power to the rectifying means, but rather maintains the electrical connection between the source of AC voltage and the rectifying means and selectively applys switching signals to the gate of its rectifying means in response to the removal of the AC voltage from the motor to be braked.

It is a still further object of this invention to provide a new and improved electronic alternating current induction motor brake that completely isolates the motor brake from the other motor circuits including its starter circuit, except for the braking period.

It is an even still further object of this invention to provide a new and improved electronic alternating current induction motor brake that is capable of being used with a wide range of motors and associated machinery as would be energized at varying levels of and with different phase(s) of voltage and current.

In accordance with these and other objects of the invention, there is disclosed a braking control circuit in accordance with the teachings of this invention is adapted for an alternating current motor having a winding and adapted to be coupled to an energizing control circuit for connecting a source of AC voltage to and for disconnecting the source of AC voltage from the winding. More specifically, the braking control circuit comprises a selectively controlled rectifier operative in a first conductive mode for applying rectified current to the winding to brake the motor and in a second nonconductive mode. A switching circuit is coupled to the rectifier and is responsive to the disconnecting of the source of AC voltage from the winding for switching the rectifier between its first and second modes at a first switching rate to brake the motor rotation at a corresponding first braking rate and, thereafter, for switching the rectifier between its first and second modes at a second switching rate different from the first switching rate to brake the motor at a corresponding second braking rate.

In a further aspect of this invention, the braking control circuit further includes a second selectively controlled rectifier coupled in parallel with the winding of the motor and operable in a first conductive mode and in a second non-conductive mode. The switching control circuit is responsive to the disconnecting of the source of AC voltage from the winding for disposing during a braking period a second rectifier in its first conductive mode to provide a return path for the DC current generated in the winding in the intervals between the application of the DC current pulses by the first rectifier.

In a still further aspect of this invention, the braking control circuit comprises a voltage sensing circuit coupled to the source of AC voltage for sensing each zero crossing thereof to provide a corresponding time signal. The switching control circuit is responsive to the time signal for switching the rectifier between its first and second modes at controlled points in times with respect to the zero crossings of the AC voltage.

BRIEF DESCRIPTION OF THE DRAWINGS

A detailed description of a preferred embodiment of this invention is hereafter made with specific reference being made to the drawings in which.

DESCRIPTION OF THE PREFERRED EMBODIMENT

Figure 1:
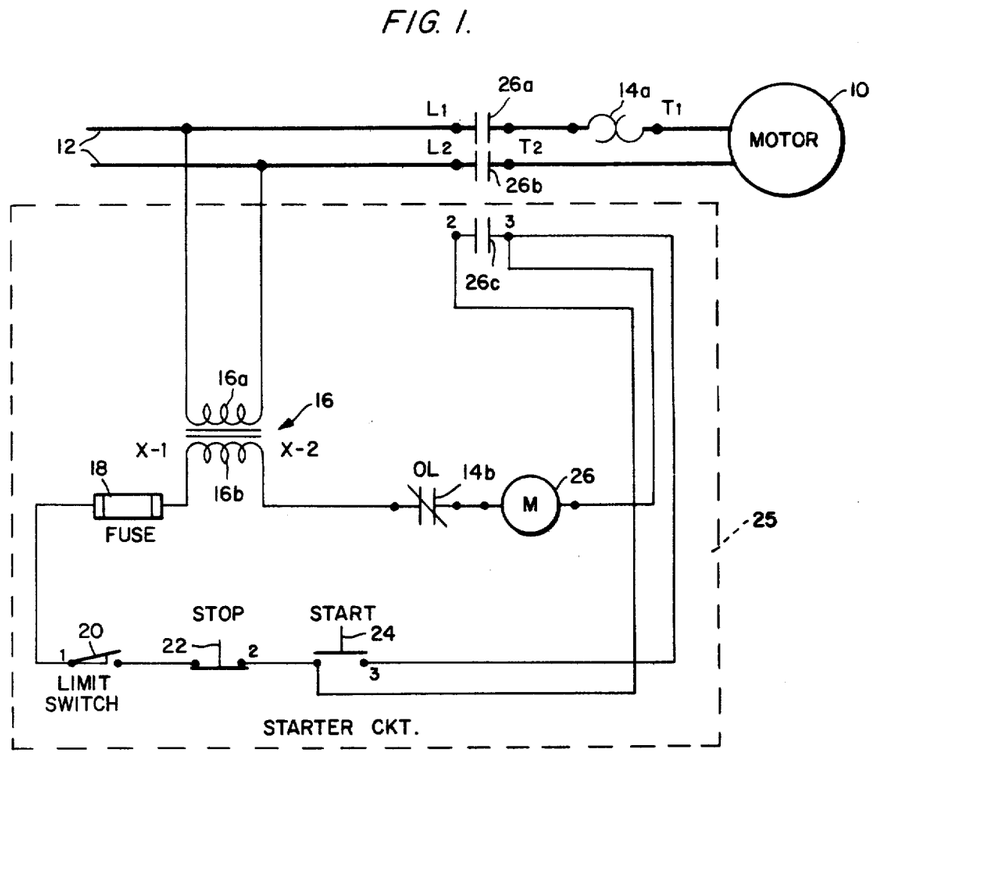
FIG. 1 is a circuit diagram of an energizing or motor starter circuit with which the electronic alternating current induction motor brake circuit of this invention is connected.

Referring now to the drawings and in particular to FIG. 1, there is shown an energizing or motor starter circuit 25 for selectively applying to and removing single phase AC voltage from an alternating current induction motor 10. The electronic alternating current induction motor brake circuit in accordance with the teachings of this invention, is fully shown in FIGS. 2A, 2B, and 2C, and is adapted to be connected to a number of terminal points of the circuitry shown in FIG. 1. The motor starter circuit 25 as shown in FIG. 1 may be readily replaced by a similar circuit as adapted to energize and de-energize a poly-phase alternating current motor. Both types of single phase and poly-phase starter motors are well known in the art and are described in detail in a publication published by the assignee of this invention and entitled *INSTRUCTION MANUAL: 24 Volt LVC (Low Voltage Control) MAGNETIC MOTOR CONTROL SYSTEMS*. The motor starter circuit 25, as shown in FIG. 1, is particularly adapted to operate with an electric motor for driving a 9 inch × 16 inch bandsaw. As shown in FIG. 1, single phase AC voltage is applied by a pair of conductors 12 via a pair of corresponding power contacts 26a and 26b to the motor 10. In addition, an overload block 14a is inserted between the power contact 26a and one terminal of the motor 10. Further, the starter circuit 25 includes a transformer 16 having a primary winding 16a which is connected across the lines 12 and a secondary winding 16b having a pair of terminals X-1 and X-2. Terminal X-2 is connected in series circuit through a normally closed overload switch 14b to a magnetic contactor coil 26 that upon being energized closes each of the coupled power contacts 26a, 26b, and 26c. The other terminal X-1 of the primary winding 16b is coupled via a fuse 18, a normally closed limit switch 20, and a normally closed stop switch 22 to a normally open start switch 24. As shown in FIG. 1, a terminal 1 is associated with the limit switch 20, a terminal 2 is associated with the stop switch 22 and a terminal 3 is associated with the start switch 24. Terminal 3 of the start switch 24 is coupled to each of the power contact 26c and to the magnetic contactor coil 26. In operation, the start switch 24 is closed to thereby complete a circuit from the secondary winding 16b upon which appears a low voltage to the magnetic contactor coil 26, whereby each of the power contacts 26a, 26b, and 26c is closed to thereby apply the AC voltage, which may illustratively be any one of 90, 120, 220, 440, 480 or 550 volts, to the motor 10. In order to de-energize the motor 10, the stop switch 22 is opened, thereby interrupting the circuit to the magnetic contactor coil 26, opening the power contacts 26a, 26b, and 26c, and thereby removing the energizing voltage from the motor 10.

Figure 2A:
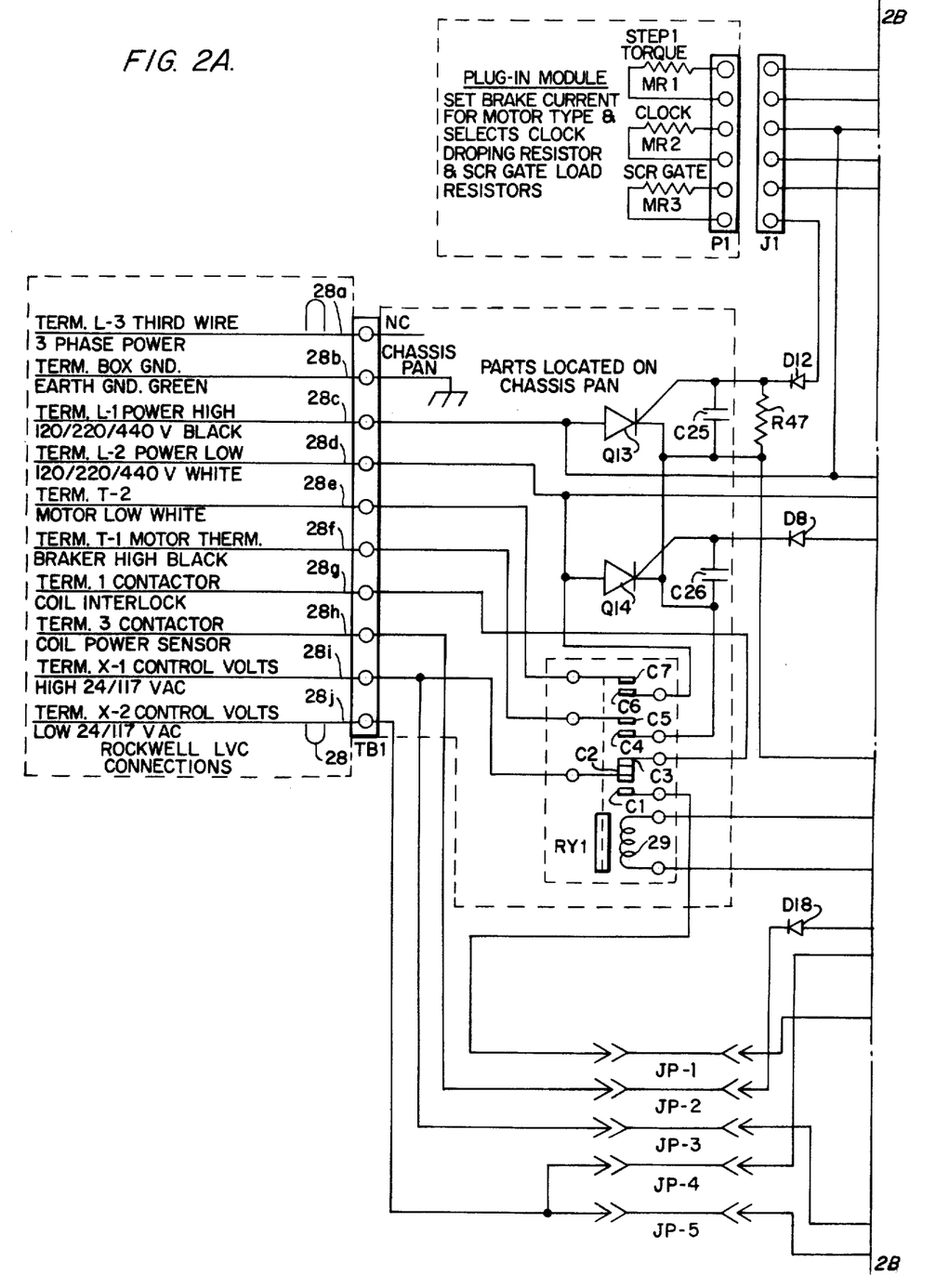
FIGS. 2A, 2B, and 2C show a detailed schematic diagram of the improved electronic AC induction motor brake circuit of this invention.
Figure 2B:
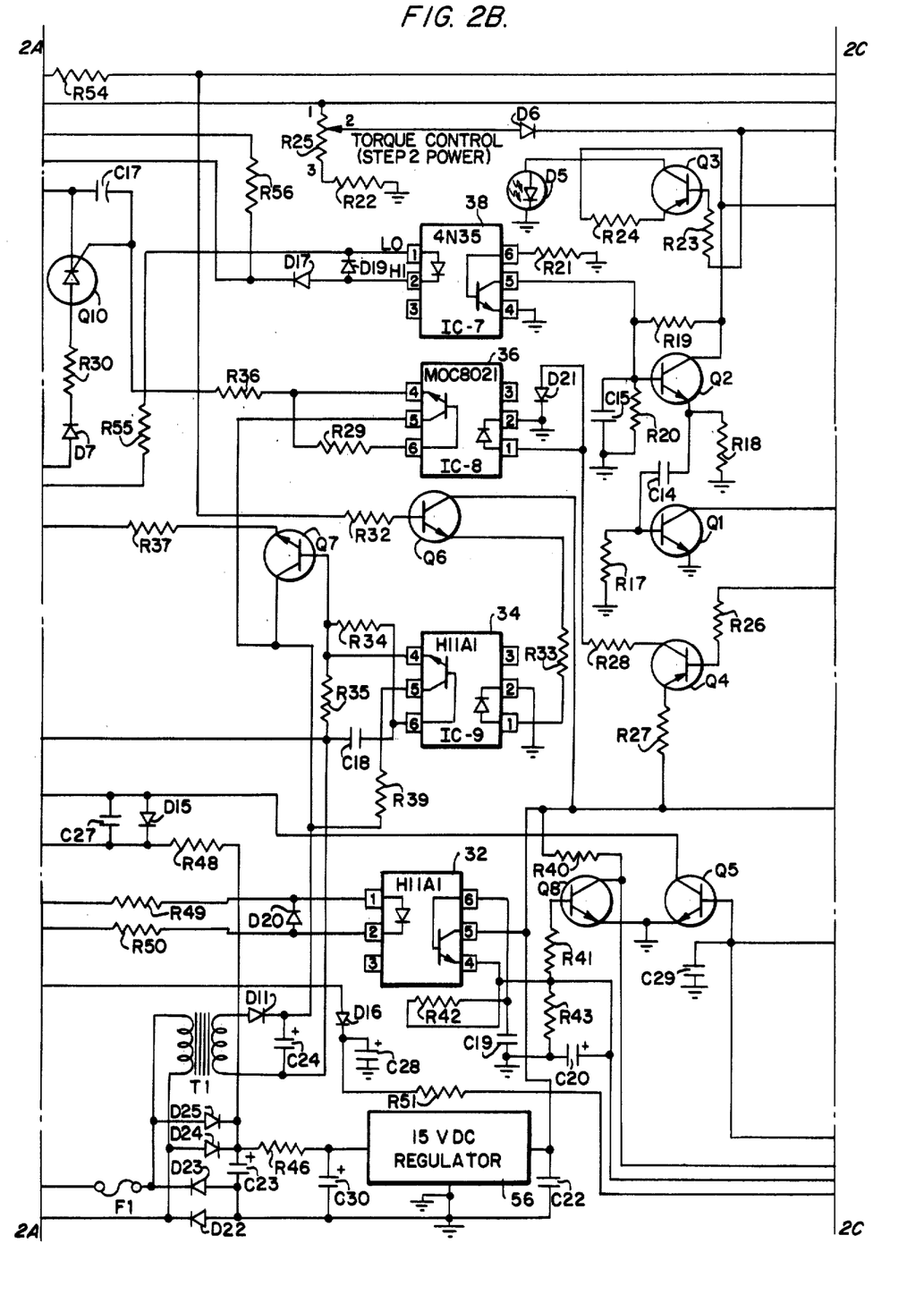
Figure 2C:
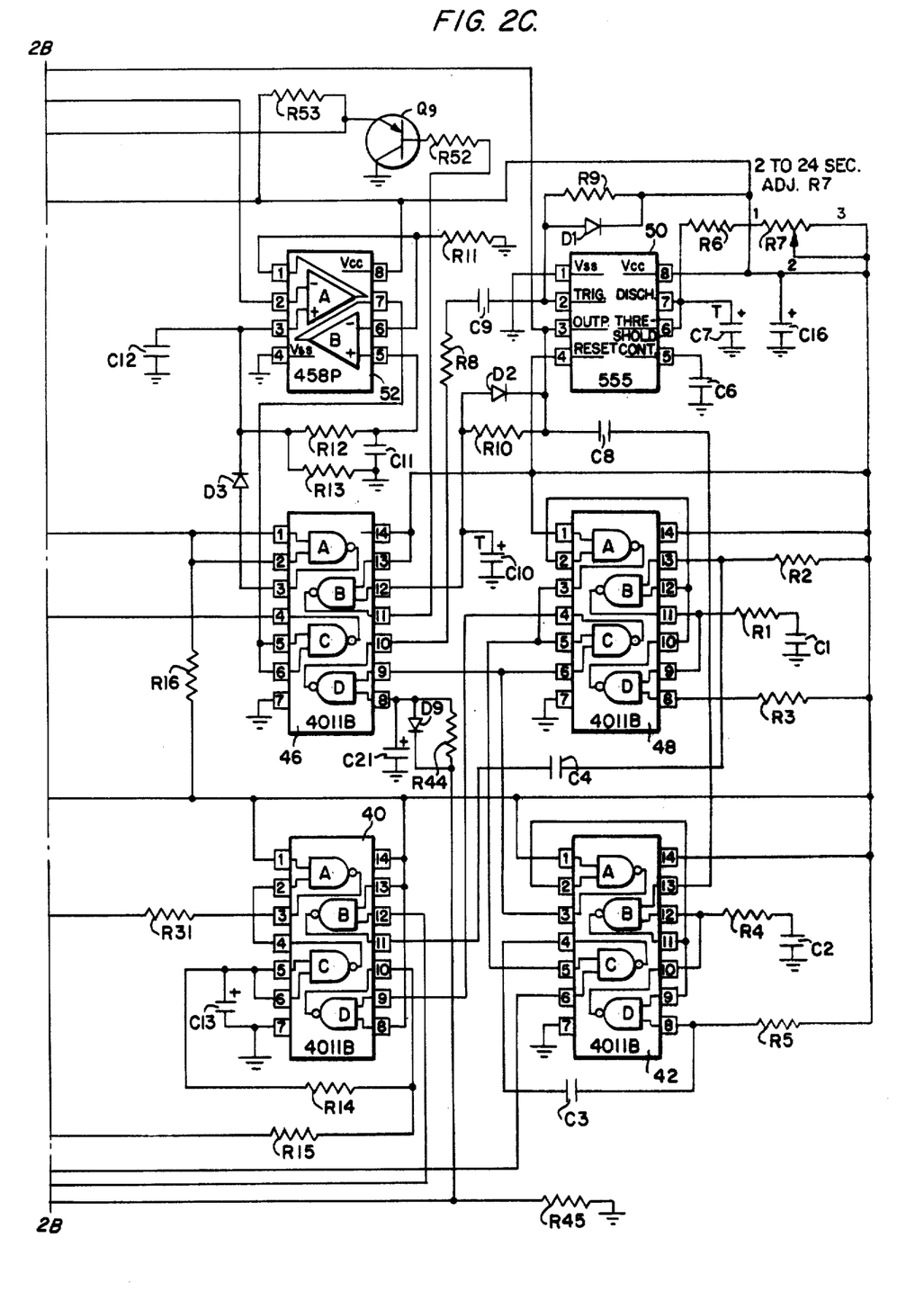

The electronic alternating current induction motor brake circuit of this invention is shown in detail in FIGS. 2A, 2B, and 2C; this circuit is adapted to be coupled by a bus or array of conductors 28 to selected terminals of the circuitry shown in FIG. 1. As shown in FIG. 2A, the array of conductors 28 includes a conductor 28a which is not used in the present embodiment of this invention, but would be used if the motor 10 to be braked were a three phase induction motor. Conductor 28b is connected to ground. Conductors 28c and 28d are respectively coupled to terminals L1 and L2 as shown in FIG. 1, whereby the relatively high voltage, e.g. one of 120, 220, or 440 volts, is applied to the motor brake circuit as shown in FIGS. 2A, 2B, and 2C. Conductors 28e and 28f are connected via terminals T1 and T2, as shown in FIG. 1, to the motor 10 and in particular to the winding of the motor 10. In turn, conductors 28g and 28h are connected to terminals 1 and 3 of the starter circuit 25 for sensing the de-energization of the motor 10 and, in particular, the opening of the stop switch 22. Finally, conductors 28i and 28j are connected to the secondary winding 16b and, in particular, to terminals X-1 and X-2 for receiving and applying the relatively low voltage appearing at the secondary winding 16b to energize the elements of the motor brake circuit.

A relay RY1, as shown in FIG. 2A, is provided with an energizing coil 29 and a plurality of contacts C1 through C7 that are disposed as shown in FIG. 2A when the coil 29 is unenergized; it is understood that upon the application of an energizing voltage, as will be explained, to the coil 29, that contacts C1 and C2, contacts C4 and C5, and contacts C6 and C7 are closed. When closed, contacts C4 and C5 serve to connect a rectifying means in the form of a silicon controlled rectifier (SCR) Q13 in series through T1 to the motor 10 and, in particular, its winding. The anode of the SCR Q13 is coupled via conductor 28c and terminal L-1 to the high side of the AC voltage, whereby the SCR Q13 when rendered conductive or fired applies a rectified voltage to the motor's winding. In similar fashion, contacts C6 and C7, and contacts C4 and C5 couple a free wheeling diode in the form of an SCR Q14 in shunt or parallel with the motor's winding. Contacts C1 and C2, when closed, apply the high side of the 24 volts as developed by the secondary winding 16b at terminal X-1 to a diode D16 (see FIG. 2B), which rectifys the low voltage to apply a corresponding DC voltage to a timing circuit comprised of capacitor C21 and resistor R44 (see FIG. 2C), which establishes a timing interval after the energization of the relay RY1 before applying, as will be explained, an initiate timing signal to a timer 50, as shown in FIG. 2C.

The starter circuit 25 and the single phase lines 12 are isolated from the timing and logic circuitry of the motor brake circuit by a plurality of optical isolators 32, 34, 36, and 38. In particular, the output terminal 4 of the optical isolator 36 is applied via a resistor R36 to fire a power gate driver in the form of an SCR Q10, which upon firing applies a control signal via an SCR gate load resistor MR3 and a diode D12 to the gate of SCR Q13. The use of the SCR Q10 permits the timing and logic circuitry to be used with power sources of a greater voltage range typically from 90 to 550 volts. In similar fashion, an output as developed from terminal 4 of the optical isolator 34 is applied to render conductive transistor Q7, whereby a high going signal is applied via diode D8 to the gate of the free wheeling diode in the form of the SCR Q14. As shown in FIG. 2A, the contact C1, as well as the conductors 28H, 28I, and 28J are connected to the remaining elements of the timing and logic circuit by a set of jumpers JP1 to JP5.

The AC voltage as appears at terminal L2 is applied via conductor 28d to a terminal 1 of the optical isolator 38; the output of the optical isolator 38 is taken from its terminal 5 and is used to sense the zero crossing points, whereby the control signals to be applied to the gate of SCR Q13 are synchronized with respect to the detected zero crossing points. In similar fashion, the opening of the power contact 26c, i.e. the opening of the stop switch 22, is sensed by the optical isolator 32 which is coupled via conductors 28h and 28j to terminals X-2 and 3, as shown in FIG. 1. Upon the closing of the power contact 26c, a low voltage illustratively in the order of 24 volts is rectified by the diode D18 and appears across input terminals 1 and 2 of the optical isolator 32; upon opening of the contact 26c, this low voltage is removed from the optical isolator 32.

The operation of the starter circuit 25 and the motor braking circuit as shown in FIGS. 2A, 2B, and 2C will be described generally in terms of three operative states. Initially in a first READY POWER ON state, the start switch 24 is open, the magnetic contactor coil 26 unenergized and its power contacts 26a and 26b do not yet couple the relatively high AC voltage appearing on the lines 12 to the motor 10. The start switch 24 is actuated to initiate a second TOOL MOTOR ON state, wherein the magnetic contactor coil 26 is energized, its power contacts 26a and 26b are closed and the AC voltage appearing on the lines 12 is applied via the closed contacts 26a and 26b to energize the motor 10. To start a third MOTOR BRAKING state, the stop switch 22 is depressed to interrupt the application of the low voltage as appearing at the secondary winding 16b to the magnetic contactor coil 26, whereby its power contacts 26a and 26b are opened to thereby remove the AC voltage from the motor 10. In the third state, the opening of the stop switch 22 and, in particular, the removal of the relatively low voltage is sensed by the optical isolator 32 to first energize the excitation coil 29, whereby the relay contacts C6 and C7, C4, and C5, and C1 and C2 are closed respectively. As explained above, the closing of contacts C4 and C5 connects the SCR Q13 via the conductor 28f and the terminal T1 in series with the motor 10 and, in particular, its winding. The SCR Q13 operates as a half-wave gated DC pulse generator providing rectified DC current pulses to the motor 10 during the third MOTOR BRAKING state. The gate "on time" of the SCR Q13 is controlled by the motor brake circuitry as shown in FIGS. 2A, 2B, and 3C by selectively controlling the conduction angle and, in particular, a selected portion of the entire 180° of the positive going cycle of the AC voltage as applied to the single phase lines 12. The SCR Q13 is fired for the selected portion or conduction angle, whereby the braking force and, in particular, the width of DC current pulses supplied to the motor 10 can be selectively varied.

In a significant feature of this invention, a controlled braking profile is applied to the motor 10. Intitially after the stop switch 22 has been opened, a relatively high current corresponding to a large conduction angle is applied to the motor 10, whereby the motor 10 is rapidly decelerated for a first portion of the MOTOR BRAKING state (illustratively, one second). Thereafter, the conduction angle of the SCR Q13 is reduced during a second portion of the MOTOR BRAKING state to thereby supply a corresponding smaller DC current to the motor 10, whereby the braking force applied to the motor 10 is reduced dependent upon the physical configuration of the motor 10 and its associated machinery. If the relatively high braking force were continued to be applied to the motor 10, the resultant inertial stresses might otherwise cause damage to the motor 10 and/or its attached machinery. As will be explained, the initially applied high current to effect the initial, high braking effort is set by a resistance MR1 that is part of a plug-in module 54. The plug-in module 54 further comprises a resistor MR2 that is set in accordance with the live voltage appearing the on lines 12 and a resistor MR3 that is related to the electrical characteristics of the SCR Q13 and, in particular, controls the current for firing the SCR Q13. Further, in the second portion of the MOTOR BRAKING state a resistor R25 is coupled in parallel with the resistor MR1 to thereby reduce the conduction angle of the SCR Q13 and thus the braking current and force applied to the motor 10. It is understood that the motor brake circuit as shown in FIGS. 2A, 2B, and 2C may be applied to a variety of motors 10 and adapted for varying voltages as may be applied to the motor 10. Illustratively, the motor brake circuit 25 is readily adaptable for single or multiple phase voltages, and for voltage magnitudes of 90, 120, 220, 440, 480 or 550 volts AC. With the motor brake circuit of this invention, the motor braking torque is sequentially reduced during the MOTOR BRAKING state as opposed to applying a fixed braking force to the motor 10.

In the third MOTOR BRAKING state, the closed contacts C4 and C5, and C6 and C7 connect the SCR Q14 in shunt or parallel across the winding of the motor 10. The SCR Q14 functions as a "controlled" free wheeling diode to improve braking efficiency by providing between the application of the DC braking pulses a return path for the DC current generated in the winding of the motor 10. In contrast to the prior art, the free wheeling diode function is effected solely during the third MOTOR BRAKING state by the selective gating of the SCR Q14.

A further significant advantage of this invention is the use of a relatively small power relay RY1 that is achieved through the use, in part, of the controlled gating of both the SCR's Q13 and Q14 thus avoiding the use and therefore the expense of a set of relatively large motor contactors as has been employed in the prior art. In particular, when the stop switch 22 is opened to enter the third MOTOR BRAKING state, the SCR's Q13 and Q14 are initially both turned off and the relay RY1 is de-energized. First, the contacts 26a and 26b are opened to remove the high AC voltage from the motor 10, and then the removal of the relatively low voltage is sensed by the optical isolator 32 to initiate the energization of the relay RY1. Only after the contacts of the relay are closed, are the SCRs Q13 and Q14 energized. In similar fashion, after the motor 10 has been brought to a stop, the SCRs Q13 and 14 are turned off and, then, the relay RY1 de-energized. With this control, the closing and opening of the contacts of the relay RY1 are done in dry circuit conditions, i.e. no current is applied to the relay contacts at their time of opening or closing as would otherwise establish high level switching transients as typically occur with prior art DC braking circuits which use heavy duty motor starting contactors for this function.

Now, a detailed explanation of the operation of the logic circuitry as incorporated in the motor braking circuit of FIGS. 2A, 2B, and 2C will be given. First considering the first READY POWER ON state, the start switch 24 is open with the result that the power contactors 26a, 26b, and 26c are likewise open. As a result, no voltage is applied via terminals 1 and 3 and the conductors 28g and 28h to the motor brake circuit of FIGS. 2A, 2B, and 2C. However, it is understood that a low voltage, illustratively in the order of 24 volts AC, is applied via the terminals X-1 and X-2 and their corresponding conductors 28i and 28j to the motor brake circuit and, in particular, to a full wave rectifying bridge as comprised of the diodes D22, D23, D24, and D25 (see FIG. 2B), whereby a DC voltage is filtered by a filter circuit comprised of resistor R46 and capacitor C30 to be regulated by a regulator 56 to apply a substantially constant amplitude DC voltage to energize the logic circuit elements of this motor brake circuit. With no voltage being applied via terminal 3 and conductor 28h, no voltage is applied to the optical isolator 32 which functions to sense whether the power contactors 26a, b, and c are closed. As a result, the output as appears at terminal 4 of the optical isolator 32 is low thus applying a low voltage to the base of transistor Q8 and the regulator 56 applies a high voltage to its collector, whereby the transistor Q8 is rendered non-conductive (or disposed to its high state). As a result, a high signal is applied to the input terminal 6 of the quad NAND gate 42 (see FIG. 2C), whereby a high signal is developed at its terminal 4 and in turn is applied to its terminal 8, a low signal is developed at terminal 10 and applied to terminal 12 thereof, and a high signal is thus developed at terminal 11 and applied to terminal 2, whereby the terminal 3 of the quad NAND gate 42 goes low. In turn as seen in FIG. 2C, terminal 3 of the quad NAND gate 42 is coupled to terminal 6 of the quad NAND gate 48 maintaining this terminal low; as a result, terminal 4 of the quad NAND gate 48 is disposed high. In turn, terminal 4 of the quad NAND gate 48 is coupled to terminal 9 of the quad NAND gate 40 forcing terminal 9 high and terminal 10 low. As seen in FIGS. 2B and 2C, terminal 10 of the quad NAND gate 40 is coupled via terminal 5 and gates C and A thereof to the base of transistor Q5, as well as directly to the base of transistor Q5. The low input to terminal 5 forces the terminal 4 of the quad NAND gate 40 to go high, thereby applying a high to terminal 4, causing terminal 3 to go low. Thus, a low signal is applied from both of terminals 10 and 3 of the quad NAND gate 40 in a redundant fashion to the base of transistor Q5 thereby further turning off the transistor Q5. Further in the first READY POWER ON state, the contact C1 of the relay RY1 is open, whereby terminal 8 of the quad NAND gate 46 is maintained low; as explained before a low signal is applied to the terminal 6 of the quad NAND gate 48 and as shown in also applied to terminal 9 of the quad NAND gate 46, whereby the terminal 10 thereof is maintained high, whereby the input to the terminal 2 of the timer 50 is also maintained high thus preventing the timer 50 from commencing a timing sequence of operations.

In the second TOOL MOTOR ON state, the start switch 24 is closed thus appling a relatively low voltage AC, e.g. 24 volts, via terminals 1 and 3 and the corresponding conductors 28g and 28h to the motor brake circuit of FIGS. 2A, 2B, and 2C. As seen in FIG. 2A, the low voltage is applied via conductor 28h and diode D18 to the input terminal 1 of the optical isolator 32 (see FIG. 2B), whereby a high voltage is applied from its terminal 4 to the base of transistor Q8, rendering transistor Q8 conductive and forcing its collector low. In turn, the terminal 6 of the NAND gate 42 (see FIG. 2C) as coupled to the collector of transistor Q8, is forced low, whereby terminal 4 is disposed high, terminal 10 is forced low, terminal 11 is forced high and terminal 3 of quad NAND gate 42 is forced low. As seen in FIG. 2C, terminal 3 of the quad NAND gate 42 is coupled to the input terminal 9 of the quad NAND gate 46, thus maintaining its terminal 10 high and thereby preventing the triggering of the timer circuit 50. In addition, the high signal appearing at terminal 4 at the optical isolator 32 is also coupled to the terminal 12 of the quad NAND gate 40, whereby its terminal 11 as well as terminal 13 of quad NAND gate 48, as coupled thereto, are forced high. In turn, terminal 11 of the quad NAND gate 48 is forced high thus effecting a change of state of the quad NAND gate 40 which in a sense acts as a flip flop. The logic elements of the motor brake circuit are now in their appropriate logic states for the beginning of the third MOTOR BRAKING state.

The third MOTOR BRAKING state is commenced by the opening of the stop switch 22, whereby the low voltage appearing at terminal 3 during the second state is removed from its corresponding conductor 28h during the third MOTOR BRAKING state. When the low voltage is removed and thus the contacts 26a and 26b of FIG. 1 are opened, the low voltage is removed from the terminal 1 of the isolator 32 of FIG. 2B which acts as a contactor sensor means and its terminal 4 goes low thus rendering transistor Q8 conductive forcing its collector high. The collector of transistor Q8 is coupled to the terminal 6 of the quad NAND gate 42 (see FIG. 2C) thus forcing it high. In turn, the terminal 4 and thus the terminal 8 of the quad NAND gate 42 are forced high, the terminal 10 high, the terminal 11 low and, as a result, terminal 3 thereof is forced high. Terminal 3 of the quad NAND gate 42 is coupled to each of terminal 6 of the quad NAND gate 48 and terminal 9 of the quad NAND gate 46, whereby the terminal 10 thereof is forced low thereby removing the high clamping voltage from one side of the capacitor C9 thus enabling the timer 50. The high signal applied to the terminal 9 of the quad NAND gate 46 is also applied to terminal 6 of the quad NAND gate 48, whereby its terminal 4 and the coupled terminal 9 of the quad NAND 40 goes low. As a result, terminal 10 of the quad NAND gate 40, as well as terminals 5 and 6 coupled thereto, go high and terminal 4 thereof goes low. Terminal 4 is coupled to terminal 2, whereby terminal 3 of the quad NAND gate 40 goes high along with terminal 10 thereof to render transistor Q5 conductive to complete a circuit to ground to effect thereby the energization of the excitation coil 29. Upon energization of the relay RY1, the contacts C1 and C2, C4 and C5, and C6 and C7 are closed whereby a low voltage AC is applied from terminal X-1 and conductor 28i via closed contacts C2 and C1, diode 16 and resistor R51 (see FIG. 2B) to a delay timing circuit comprised of resistor R44 and capacitor C21, whereby capacitor C21 charges in a period in the order of 0.7 seconds to place a high signal on terminal 8 of quad NAND gate 46. Remembering that terminal 9 has previously been set low, terminal 10 of the quad NAND gate 46 as well as terminal 2 of the timer 50 goes low to initiate the timing function of the timer 50. In this regard, terminals 6 and 7 of the timer 50 are coupled to a timing circuit comprised of capacitor C7, resistor R6 and potentiometer R7. In an illustrative embodiment of this invention, potentiometer R7 may be set to impart a timing interval in the range of 2 to 28 seconds to impart for that selected interval a braking torque to the motor 10.

Upon the initiation of the timing interval as controlled by the timer 50, a pulse of a corresponding width is developed at the output terminal 3 thereof. As shown in FIGS. 2A, 2B, and 2C terminal 3 of the timer 50 is coupled to the plug-in module 54 and, in particular, to the torque resistor MR1, whereby a control or reference voltage will be developed, as well be explained, to apply a corresponding DC current via the SCR Q13 to the motor 10 to effect the maximum braking thereof. In particular, the control signal as derived from the resistor MR1 is applied to terminal 2 of an OP AMP 52 (see FIG. 2C) to be compared to a period timing signal in the form of a ramp applied to terminal 3 thereof. OP AMP 52 acts as a comparator of the signals applied to its terminals 2 and 3. The ramp voltage applied to terminal 3 is also applied to terminal 5 of the OP AMP 52, whereby a second redundant comparison is made with the output obtained from terminal 1 and coupled to terminal 6 of the OP AMP 52. The output as obtained from terminal 7 is a control signal in the form of a pulse whose width is of an interval to set the conduction angle of the SCR Q13. More specifically, when the ramping voltage as applied to terminals 3 and 5 of the OP AMP 52 exceeds the reference level as set, for example, by the value of the resistor MR1, a high signal is derived for that interval from terminal 7 of the OP AMP 52. The output from terminal 7 of the OP AMP 52 is applied to terminals 5 and 6 of the quad NAND gate 46 to apply a corresponding output at terminal 4 with any DC offset removed to the base of transistor Q4, whereby transistor Q4 is rendered conductive to apply a high signal of like duration via the optical isolator 36 and, in particular, from its terminal 4 to the gate of the power driver SCR Q10, whereby the SCR Q10 is fired and a control signal is applied through the resistor MR3 of the plug-in module 54, diode D12 to the gate of the SCR Q13 to gate or fire the SCR Q13 for a corresponding portion of the positive cycle (0° to 180°) of the high AC voltage.

The output, i.e. terminal 3, of the timer 50 is also applied to a timing circuit comprised of resistor R10 and capacitor C10 (see FIG. 2C), which controls the timing of the initial braking period of the third MOTOR BRAKING state in which a relatively high positive current is applied to the winding thus effecting that maximum decelerating effect upon the motor 10. It is during this initial period that the reference level signal as applied to terminal 2 of the OP AMP 52 is set solely by the resistor MR1. Illustratively, the impedance values of resistor R10 and capacitor C10 are set to time an interval in the order of 1.0 seconds. Upon charging of the capacitor C10, the input terminal 12 of the quad NAND gate 46 is rendered high, whereby terminal 11 thereof applies a high signal to the base of transistor Q9 rendering it conductive thereby effectively coupling of a potentiometer R25 in circuit with the resistor MR1 to thereby decrease the reference level voltage applied to terminal 2 of the OP AMP 52, thereby reducing the conduction angle that SCR Q13 is fired. As a result, a reduced DC current is applied to the winding of the motor 10 dependent upon the setting of potentiometer R25. In an illustrative embodiment of this invention the setting of resistor R25 will determine the reduced braking force as applied to the winding for the second portion of the period after the timing circuit comprised of resistor R10 and capacitor C10 has timed out until the end of the timing period set by timer 50.

In a further aspect of this invention, the motor brake circuit as shown in FIGS. 2A, 2B, and 2C senses the phase angle of the high AC voltage as applied to the single phase lines 12. In particular, the high AC voltage as appearing at terminals L1 and L2 and on conductors 28c and 28d is applied via resistor R55 to the input terminal of the optical isolator 38 (see FIG. 2B), which acts in circuit with each of transistors Q1 and Q2 as a zero or reference voltage crossing detection circuit or means. In particular, an output is obtained from terminal 5 of the optical isolator 38 and applied to the base of transistor Q2 rendering it conductive, whereby a high signal is also applied to the base of transistor Q1 rendering its conductive. As a result, a signal corresponding to the high AC voltage is applied from the collector of transistor Q1 to terminals 1 and 2 of the quad NAND gate 46, whereby an inverted voltage is applied via diode D3 to initiate the periodic charging of capacitor C12, whereby the aforementioned ramp signal is developed. Thus, as the high alternating current (AC) voltage passes through its zero or reference voltage level, a positive going signal is developed at terminal 3 of the quad NAND gate 46 thus forward biasing diode D3 and initiating the charging of capacitor C12. It is understood that a new ramp signal will be initiated with each positive going cycle of the high AC voltage.

In a further significant aspect of this invention, the free wheeling diode in the form of the SCR Q14 is turned on by the timer 50 and will remain conductive for that interval as set by the timer 50 and, in particular, the setting of the potentiometer R7. As sown in FIGS. 2B and 2C, the output terminal 3 of the timer 50 is coupled to the base of transistor Q6, which is rendered conductive by the high going output of the timer 50. In turn, a high signal is applied via an optical isolator 34 to the base of transistor Q7 to apply a signal to terminal 1 of the optical isolator 34. In turn, the signal appearing at terminal 4 of the optical isolator 34, renders transistor Q7 conductive to thereby fire the SCR Q14, thus placing the SCR Q14 in parallel across the winding of the motor 10. The selective switching of the SCR Q14 is significant in that it permits the use of the low power relay RY1 in that no load is imposed upon the contacts of the relay RY1 until after its excitation coil 29 has been energized and its contacts closed.

Thus there has been described a motor braking circuit that has significant advantages over those of the prior art. First, the motor brake circuit of this invention permits the application of a selective braking profile. In particular, DC current is applied via an SCR connected in series with the winding of the motor to be controlled. Illustratively an initial period of braking is effected in which maximum braking is imparted to the motor dependent upon the electrical and mechanical characteristics of that motor and its coupled tool, followed by a second period in which a reduced DC braking current is applied to the winding to prevent inertial forces from being imposed on the motor or its attached mechanism such as a tool, that might otherwise damage the motor or its tool. It is understood that this motor brake circuit sets the total time during which braking is effected. In a further significant aspect of this invention, a free wheeling diode is selectively switched into and out of a parallel circuit relationship with the winding of the motor. In addition, the relatively high AC voltage is sensed as to those points in which the voltage crosses a reference level, e.g. zero volts, to thereby coordinate the firing of the SCR that applies DC current pulses to the winding to brake the motor.

In considering this invention, it should be remembered that the present disclosure is illustrative only and the scope of the invention should be determined by the appended claims.

We claim:
1. A braking control circuit for an alternating current motor having a winding and operative with an energizing control circuit for connecting a source of AC voltage to and for disconnecting the source of AC voltage from the winding, the motor coupled to rotatively drive a tool, the rotating tool developing a momentum to be braked, said braking control circuit comprising:
    (a) selectively controlled rectifying means operative in a first conductive mode for applying rectified current pulses of variable conduction angles to the winding to brake the motor with corresponding effect and in a second non-conductive mode; and
    (b) sequential conduction angle control means coupled to said rectifying means and responsive to the disconnecting of the source of AC voltage from the winding for operating said rectifying means at a first, relatively large conduction angle to brake the motor at a corresponding first braking rate, and thereafter for operating said rectifying means at a second conduction angle less than said first conduction angle to brake the motor at a second, lower braking rate, whereby a controlled braking profile is effected to improve the braking efficiency of the motor.

2. The braking control circuit as claimed in claim 1, wherein the alternating current motor has given electrical characteristics, said first conduction angle is set in accordance with the electrical characteristics of the motor to maximize the first braking rate.

3. The braking control circuit as claimed in claim 1, wherein the motor is coupled to drive rotatively a tool whereby inertial forces are imposed on the motor and the coupled tool, said second conduction angle set to ensure that the inertial forces applied to the motor and to the driven tool do not cause damage thereto.

4. The braking control circuit as claimed in claim 1, wherein said switching control means effects control of said rectifying means at said first conduction angle for a first interval of time and thereafter at said second conduction angle for a second interval of time.

5. The braking control circuit as claimed in claim 4, wherein the motor is coupled to drive a tool having given structural characteristics, and said first switching rate and said first interval are selected to prevent inertial forces from being applied to the motor and to the coupled tool to damage same.

6. The braking control circuit as claimed in claim 5, wherein said switching control means includes means for variably setting a sum of said first and second intervals dependent upon the structural characteristics of the tool coupled to the motor.

7. The braking control circuit as claimed in claim 1, wherein there is included a relay having a first set of contacts and means energizable for closing said first set of contacts to couple said rectifying means to the winding.

8. The braking control circuit as claimed in claim 7, wherein said switching control means comprises timing means responsive to the disconnecting of the source of AC voltage from the motor for energizing the relay to close said first set of contacts.

9. The braking control circuit as claimed in claim 1, wherein there is included second selectively controlled rectifying means having a terminal to be coupled in parallel with said winding and operable in a first conductive mode and in a second conductive mode, and said switching control means comprises timing means responsive to the disconnecting of the source of AC voltage for disposing said second rectifying means to its first conductive mode.

10. The braking control circuit as claimed in claim 9, wherein there is included an energizable relay having a first set of contacts for coupling said second rectifying means in parallel with the winding, and said timing means is responsive to the disconnecting of the source of AC voltage for closing said first set of contacts, whereby said second rectifier means is coupled in parallel with the winding.

11. The braking control circuit as claimed in claim 8, wherein said rectifying means comprises a silicon controlled rectifier having a gate element.

12. The braking control circuit as claimed in claim 11, wherein said switching control means is coupled to said gate element for switching said silicon controlled rectifier to its first mode for a selected portion of each cycle of the AC voltage.

13. The braking control circuit as claimed in claim 12, wherein said switching control means is responsive to said signal for setting said selected portion of the cycle of the AC voltage with respect to the reference voltage crossing.

14. The braking control circuit for an alternating current motor having a winding and operative with an energizing control circuit for connecting an AC source of voltage to and disconnecting the AC source of voltage from the winding, said braking control circuit comprising:
    (a) first selectively controlled rectifying means having a terminal to be coupled in series to the winding and operable in a first conductive mode for applying rectified current to the winding to brake the motor and in a second non-conductive mode;
    (b) second selectively controlled rectifying means having terminals to be coupled in parallel with the winding and operable in a first conductive mode and in a second non-conductive mode; and
    (c) switching control means responsive to the disconnecting of the source of AC voltage from the winding for effecting during a braking period a periodic switching of said first rectifying means between its first and second modes to apply to the winding pulses of DC current at spaced by intervals from each other, and for disposing said second rectifying means during said braking period in its first conductive mode to provide a return path for the DC current generated in the winding in said intervals between said DC current pulses by said first rectifying means when operated in its first conductive mode.

15. The braking control circuit as claimed in claim 14, wherein each of said first and second rectifying means comprises a silicon controlled rectifier having a gate element.

16. A braking control circuit as claimed in claim 14, wherein there is further included an energizable relay having first and second sets of contacts respectively associated with said first and second rectifying means and responsive to the disconnecting of the source of AC voltage from the winding for energizing said relay to close said first set of contacts whereby said first rectifying means is connected in series with the winding and to close said second set of contacts whereby said second rectifying means is connected in parallel with the winding.

17. The braking control circuit for an alternating current motor having a winding and operated with an energizing control circuit for connecting a source of AC voltage to and for disconnecting the source of AC voltage from the winding, said braking control circuit comprising:
(a) selectively controlled rectifying means having a terminal to be coupled in series with the winding and operable in a first conductive mode for applying rectified current to the winding to brake the motor and in a second non-conductive mode;
(b) voltage sensing means having a terminal to be coupled to the source of AC voltage for sensing each crossing by the AC voltage of a given reference voltage to provide a corresponding time signal; and
(c) switching control means responsive to the disconnecting of the source of AC voltage from the winding and to said time signal for switching said rectifying means between its first and second modes at controlled points in time with respect to the reference voltage crossings of the AC voltage, said switching control means comprises means responsive to the occurrence of each of said time signals for providing a signal whose voltage amplitude varies with time and independently of the voltage level of the AC voltage, comparator means for comparing said time varying signal with a reference signal for applying an actuating signal when said time varying signal exceeds a desired level of said reference signal to said selectively controlled rectifying means to dispose said selectively controlled rectifying means to its first conductive mode, and reference setting means for variably setting the voltage level of the reference signal independently of the voltage level of the AC voltage to thereby variably set a desired conduction angle of said rectifying means during a cycle of the AC voltage and, thus, the braking force applied to the alternating current motor.

18. The braking control circuit as claimed in claim 17, wherein said voltage sensing means is operative in response to an input voltage of a prescribed level, and there is included means for coupling the source of AC voltage to said voltage sensing means for adjusting the maximum level of the AC voltage to said prescribed level, whereby said braking control circuit is adapted to operate with any of a variety of alternating current motors and sources of AC voltage of various voltage ratings.

19. The braking control circuit as claimed in claim 18, wherein said adjusting means comprises a module having means to be removably inserted between the source of AC voltage and said voltage sensing means and comprises a first impedance whose impedance is set to adjust the voltage level of the AC source to said prescribed level.

20. The braking control circuit as claimed in claim 19, wherein said reference setting means comprises a second impedance set according to said desired level of said reference signal and said desired conduction angle, said second impedance mounted on said module, and means for removably connecting in circuit said second impedance with said comparator means.

21. The braking control circuit as claimed in claim 17, wherein said switching control means comprises timing means responsive to the disconnecting of the source of AC voltage from the winding for applying a first reference signal to said comparator means for a first interval of time and thereafter a second reference signal to said comparator means for a second interval of time, said first reference signal having a different level from that of said second reference signal to establish a greater conduction angle during said first interval of time than during said second interval of time.

22. The braking control circuit as claimed in claim 21, wherein the alternating current motor has given mechanical and electrical characteristics, said timing means selects the first interval of time in accordance with the electrical characteristics of the motor and for selectively varying the second interval time in accordance with the mechanical characteristics of the motor and a mechanism connected thereto to prevent undue inertial forces from being applied to the motor and its connected mechanism.

23. The braking control circuit for an alternating current motor having a winding and operative with an energizing control circuit for connecting a source of AC voltage to and for disconnecting the source of AC voltage from the winding, said braking control circuit comprising:
(a) first selectively controlled rectifying means operative at a given conduction to control a braking force applied to the motor;
(b) second selectively controlled rectifying means having terminals to be coupled in parallel with the winding and operable in a first conductive mode and in a second non-conductive mode;
(c) switch means actuatable to couple said selectively controlled rectifying means to the winding; and
(d) switching control means responsive to the disconnecting of the source of AC voltage from the winding, firstly, for actuating said switch means, whereby said first selectively controlled rectifying means is coupled in series with the winding and said second selectively controlled rectifying means is coupled in parallel with the winding and, secondly, for operating said first rectifying means between its first and second modes in accordance with said given conduction angle and operating said second rectifying means in its first conductive mode, whereby substantially no current is drawn through said switch means when it is actuated.

24. The braking control circuit as claimed in claim 23, wherein said switch means comprises a relay having a first set of contacts, which upon actuation couple said first selectively controlled rectifying means in series with the winding.

* * * * *